(12) United States Patent
Skinner

(10) Patent No.: US 8,678,489 B1
(45) Date of Patent: Mar. 25, 2014

(54) HUNTING CHAIR

(76) Inventor: David Skinner, Nuremberg, PA (US)

( * ) Notice: Subject to any disclaimer, the term of this patent is extended or adjusted under 35 U.S.C. 154(b) by 0 days.

(21) Appl. No.: 13/151,881

(22) Filed: Jun. 2, 2011

Related U.S. Application Data

(60) Provisional application No. 61/351,455, filed on Jun. 4, 2010.

(51) Int. Cl.
A47C 4/00 (2006.01)
B60N 2/04 (2006.01)

(52) U.S. Cl.
USPC ............ 297/16.1; 297/344.18; 297/440.24; 297/378.1; 297/440.22

(58) Field of Classification Search
USPC ............ 297/446.2, 16.1, 16.2, 344.18, 352, 297/440.24, 378.1, 440.22, 423.2, 377, 297/183.6, 183.4, 183.9; 182/136, 187, 182/135, 133, 129
See application file for complete search history.

(56) References Cited

U.S. PATENT DOCUMENTS

| 208,153 | A | * | 9/1878 | Clark ..................... 297/440.24 |
|---|---|---|---|---|
| 4,072,288 | A | | 2/1978 | Wirges |
| 4,337,844 | A | * | 7/1982 | Hice, Sr. .................. 182/187 |
| 4,415,135 | A | | 11/1983 | French |
| 4,695,072 | A | * | 9/1987 | Brooks ..................... 280/650 |
| 4,726,447 | A | * | 2/1988 | Gibson et al. .............. 182/135 |
| 4,798,358 | A | | 1/1989 | Brauning |
| 4,834,219 | A | * | 5/1989 | Inagaki et al. .............. 184/6.5 |
| 4,963,762 | A | * | 10/1990 | Brooks .................... 297/183.4 |
| 5,101,933 | A | * | 4/1992 | Huntley .................... 182/187 |
| 5,241,772 | A | | 9/1993 | Hall |
| 5,265,780 | A | * | 11/1993 | Matthews et al. .............. 224/155 |
| 5,279,390 | A | * | 1/1994 | Phillips ..................... 182/187 |
| 5,311,967 | A | * | 5/1994 | Kennedy ................... 182/133 |
| 5,332,283 | A | * | 7/1994 | Gray ........................... 297/58 |
| 5,466,040 | A | * | 11/1995 | Fainsztein ................. 297/183.6 |
| 5,494,333 | A | | 2/1996 | Wilson |
| D373,475 | S | * | 9/1996 | Sullivan .................... D6/335 |
| 5,740,997 | A | | 4/1998 | Wieran |
| 5,775,464 | A | * | 7/1998 | Gardner .................... 182/187 |
| 6,036,148 | A | * | 3/2000 | Shank ...................... 248/188.5 |
| 6,155,646 | A | | 12/2000 | Sisson |
| 6,308,801 | B1 | * | 10/2001 | Futch ....................... 182/136 |
| 6,474,744 | B1 | * | 11/2002 | Taylor et al. .............. 297/440.22 |
| 6,595,325 | B2 | * | 7/2003 | Ulrich ...................... 182/136 |
| 6,820,928 | B1 | | 11/2004 | Ransom |
| 6,921,135 | B2 | * | 7/2005 | Ellis et al. ................. 297/344.18 |
| 6,959,786 | B2 | * | 11/2005 | Craft ......................... 182/187 |
| D512,576 | S | * | 12/2005 | Szyperski et al. ............ D6/368 |
| D539,554 | S | * | 4/2007 | Palasini .................... D6/362 |
| 7,328,951 | B2 | | 2/2008 | Ward |
| D599,124 | S | * | 9/2009 | Cross ....................... D6/362 |
| 7,631,940 | B1 | * | 12/2009 | Jager ....................... 297/344.18 |
| 2004/0055822 | A1 | * | 3/2004 | Engstrom .................. 182/136 |
| 2009/0243345 | A1 | | 10/2009 | Carter |
| 2010/0133303 | A1 | * | 6/2010 | Schilly ....................... 224/155 |
| 2012/0061180 | A1 | * | 3/2012 | Phillips .................... 182/129 |

* cited by examiner

Primary Examiner — David Dunn
Assistant Examiner — Richard Lowry
(74) Attorney, Agent, or Firm — Robert J. Yarbrough; Lipton, Weinberger & Husick

(57) ABSTRACT

A hunting chair with several user-selectable configurations for hunting on hillsides includes a seat and back rest. A pair of support arms falls generally on the same plane as the seat and have a user-selectable length in a forward and a rearward direction. A cross brace may connect the support arms. Elongated extension members may define the user-selectable length. The elongated extension members or a pair of spikes may selectably define a pair of downwardly-extending legs.

15 Claims, 20 Drawing Sheets

HUNTING CHAIR

I. STATEMENT OF RELATED APPLICATIONS

This non-provisional patent application is entitled to priority from provisional U.S. Patent Application No. 61/351,455 by David Skinner filed Jun. 4, 2010, which application is incorporated by reference as if set forth in full herein.

II. BACKGROUND OF THE INVENTION

A. Field of the Invention

The Invention relates to hunting, particularly to hunting of deer or other big game on hillsides or in other steep terrain.

B. Description of the Related Art

Hunting is big business and hunters invest heavily in their sport. The U.S. Fish and Wildlife service reports that 10.7 million persons in the U.S. hunted deer and elk for a total of 164 million days during 2006. Total hunting expenditures in 2006 were 22.9 billion dollars.

Much of the deer habitat available to hunters includes hillsides or other sloped terrain. Deer hunting involves waiting. The hunter selects a hunting location from which the hunter can observe approaching deer, but from which the hunter hopes that he or she will not be seen by the deer. The hunter then will wait with little or no motion, often for several hours. For a long hunt, the comfort of the hunter is important.

A hunter may utilize a conventional tree stand from which to hunt, which is a chair supported many feet above the ground by the trunk of a tree. The hunter in a tree stand achieves concealment from the deer by being located above the deer's line of sight. The options for a comfortable hunt available to a hunter who remains on the ground are limited, particularly when the hunter is hunting on hill sides or in otherwise sloping terrain.

The prior art does not teach the hunting chair of the invention.

III. BRIEF DESCRIPTION OF THE INVENTION

The Invention is a hunting chair that may be configured by a hunter in the field to assume any of a variety of forms to accommodate a variety of topographical conditions that the hunter may encounter while hunting on hillsides or in otherwise sloping terrain.

The hunting chair includes a seat and a back. The back folds with respect to the seat to render the hunting chair more compact for transportation. The seat has a first and a second side. The hunting chair includes a first and a second support arm on either side of the seat and corresponding to the first and the second side. The support arms extend from the front side of the seat of the hunting chair.

Each of the two support arms features an elongated extension member. The elongated extension members allow the first and second support arm to be further extended either in the forward direction or in the rearward direction. The elongated extension members may be extended or retracted differentially to accommodate variations in terrain or in the features of the selected hunting location. The two support arms may be defined by hollow channels and the elongated extension members may telescope within the hollow channels that define the two support arms. Each of the elongated extension members may be locked into a selected position with respect to its corresponding support arm by a clevis pin, cotter pin, by a mechanical latch, by a cam lock, by a nut and bolt, by a clamp, by a wedge, by a ratchet or by or by any other conventional means to fix the relative positions of one member with another.

An angled member selectably may engage both the first and the second elongated extension members. The angled member included a bend along its length. The bend of the angled member acts to center the hunting chair on a tree or other object when the angled member is in position on either the front or the rear of the hunting chair and the angled member is in engagement with the tree or other object. The angled member may be retained to the elongated extension members any of the means by which the elongated extension members may be attached to the first and second arms.

The back of the hunting chair features two ground-engaging spikes that may be deployed on the underside of the chair at either side of the back. The back of the hunting chair has a first and a second side that correspond to the first and second support arms of the seat. The first and second side each may be defined by a hollow back channel. Each hollow back channel defining the first and second sides includes a ground-engaging spike that is extendable from the hollow back channel. Each ground-engaging spike may be selectably extended or retracted. Each ground-engaging spike may be retained in the selected location by any of the means described above to retain the elongated extension members of the two support arms.

The upper portion of the back of the hunting chair includes a pair of attachment points in a spaced-apart relation. The attachment points retain a strap or rope. In use, the rope or strap may be attached to a tree, rock, post, or other object capable of supporting the load of the hunting chair and hunter on the slope.

The hunting chair may be configured as two or more side-by-side hunting chairs for two or more persons. For a two-person hunting chair, the support arms are located on the outermost sides of the chair seat and the ground-engaging spikes are located on the outermost sides of the seat back. Alternatively, a removable two-person seat may be releasably attached to the one person hunting chair, converting the one person hunting chair into a two person hunting chair.

The hunting chair includes backpack straps that may be removable to allow the hunting chair to be carried into and out of the hunting location. The hunting chair may serve as a pack frame to which heavy loads can be attached. The hinge of the seat back may be oriented downward when the hunting chair is serving as a pack frame and the seat back may be upright to serve as a shelf to support a load when the hunter is wearing the hunting chair as a pack frame.

The elongated extension members may be exchanged for the ground-engaging spikes in the hollow back channels to support the seat of the hunting chair higher above the ground.

IV. BRIEF DESCRIPTION OF THE DRAWINGS

V. DESCRIPTION OF AN EMBODIMENT

Figure 1:
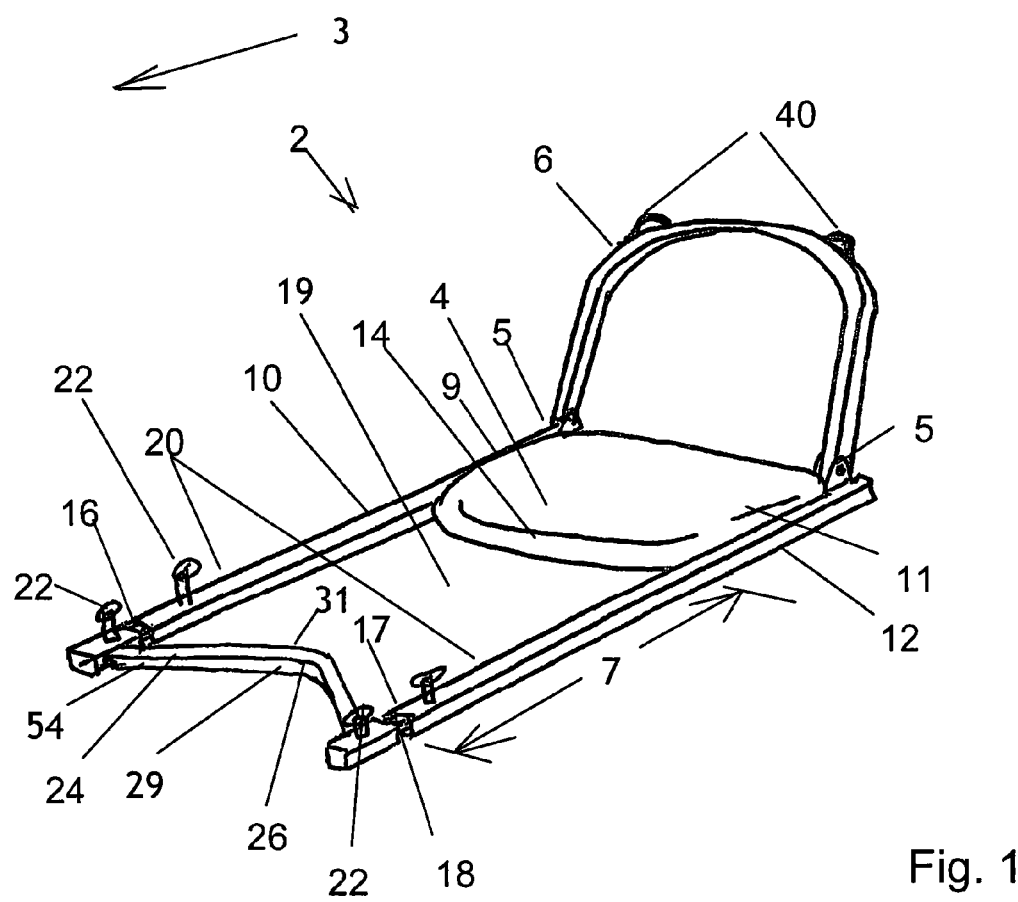
FIG. 1 is a perspective view of the hunting chair.

FIGS. 1 through 7 show the hunting chair 2. The hunting chair 2 features a seat 4 and back rest 6. Back rest 6 is foldable about hinge 5 about an upright position illustrated by FIG. 1 and a flat position illustrated by FIG. 2. In the upright position, a hunter may sit on the seat 4 and rest his or her back against back rest 6. In the flat position, the hunting chair 2 is reduced in size for easy transportation. When the hunter sits on the seat 4 with his or her back against the back rest 6 when the back rest 6 is in the upright position, the hunter is facing in a facing direction 3.

As shown by FIGS. 1-7, the hunting chair 2 includes a first support arm 10 and a second support arm 12. First and second support arms 10, 12 extend along the first and second sides 9, 11 of seat 4. First and second support arms 10, 12 and seat 4 fall fall generally upon and define a plane 19.

Figure 3:
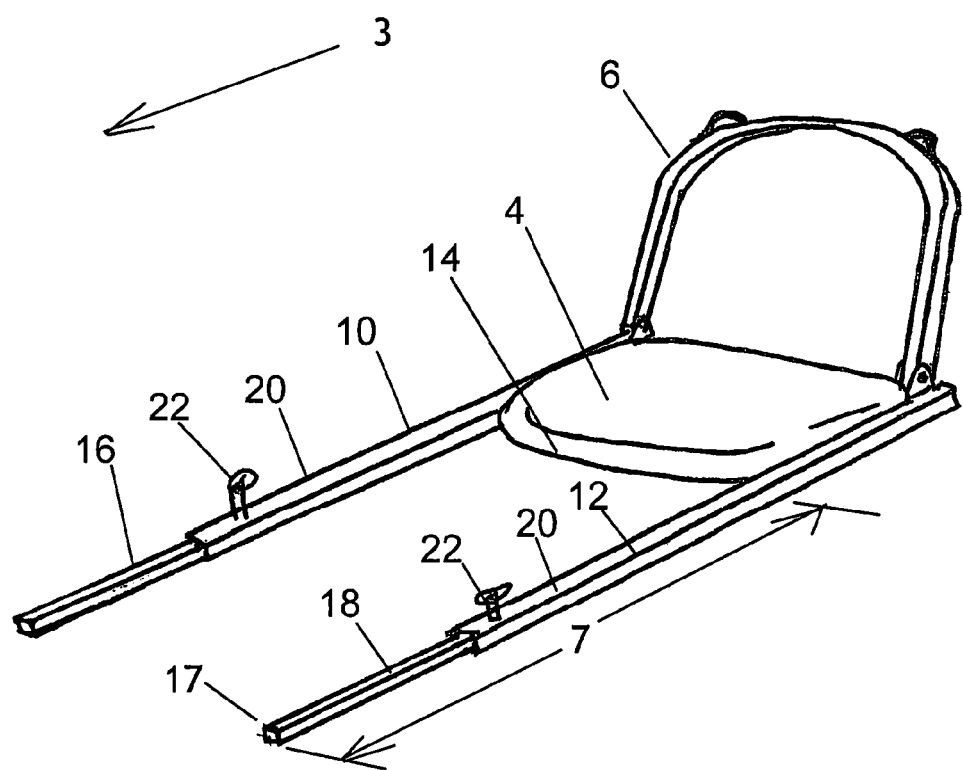
FIG. 3 is a perspective view of the hunting chair with the elongated extension members extended toward the front.
Figure 4:
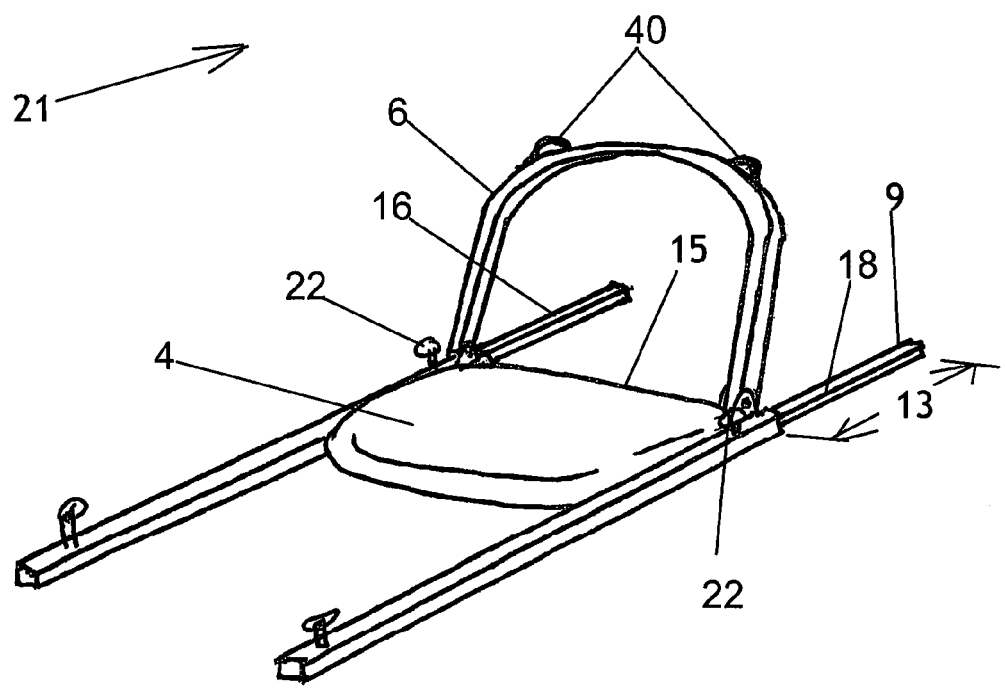
FIG. 4 is a perspective view of the hunting chair with the elongated extension members extended toward the back.
Figure 5:
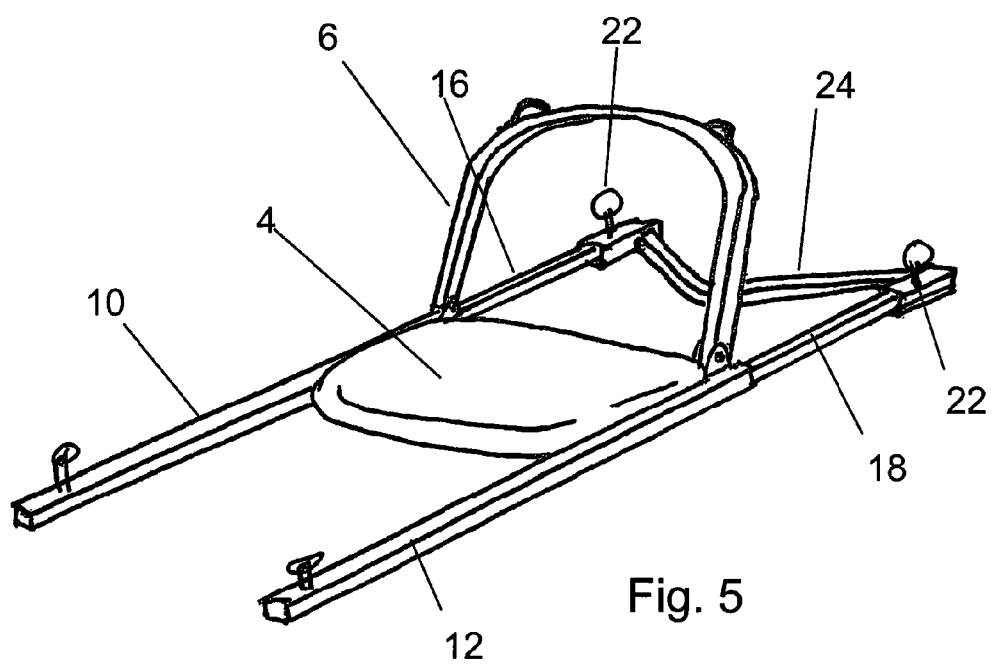
FIG. 5 is a perspective view of the hunting chair with the angled member in position on the rearward side of the hunting chair.

As shown by FIGS. 3-5, first support arm 10 and second support arm 12 may be composed of a hollow side channel 20. A first elongated extension member 16 and a second elongated extension member 18 are configured to fit within and slideably engage the first and second support arms 10, 12, respectively. The first and second elongated extension members 16, 18 may be extended or retracted differentially and as desired by the hunter. The hunter may secure the first and second elongated extension members 16, 18 in the desired location with respect to the first and second support arms 10, 12 by use of clevis pins 22. As used in this document, the term 'clevis pin 22' means a clevis pin, a cotter pin, a mechanical latch, a cam lock, a nut and bolt, a clamp, a ratchet and any other conventional means to adjustably fix the position of one member with another.

FIG. 3 illustrates that the first and second elongated extension members 16, 18 may engage support arms 10, 12 and may be extended to the front of the hunting chair 2 in the facing direction 3. First and second elongated extension members 16, 18 and first and second support arms 10, 12 in combination define a front end 17 and defines a forward length 7 from the front edge 14 of the seat 4 to the front end 17. Forward length 7 preferably is selected to accommodate the leg of a hunter between the front edge 14 and the front end 17 when the hunter is sitting on the seat 4 and facing in the facing direction 3.

FIG. 4 illustrates that the first and second elongated extension members 16, 18 may be extended to the rear of the hunting chair 2 in the rearward direction 21 opposite to the facing direction 3. First and second elongated extension members 16, 18 are secured in the desired position by clevis pins 22. When the first and second elongated extension members 16, 18 are extending in the rearward direction 21, each of the first and second elongated extension members 16, 18 has a back end 9 opposite to the front end 17. When the first and second elongated extension members 16, 18 extend from the rear of the hunting chair, each of the first and second elongated extension members 16, 18 defines a rearward length 13 from the rear edge 15 of the seat 4 to the back end 9.

Figure 2:
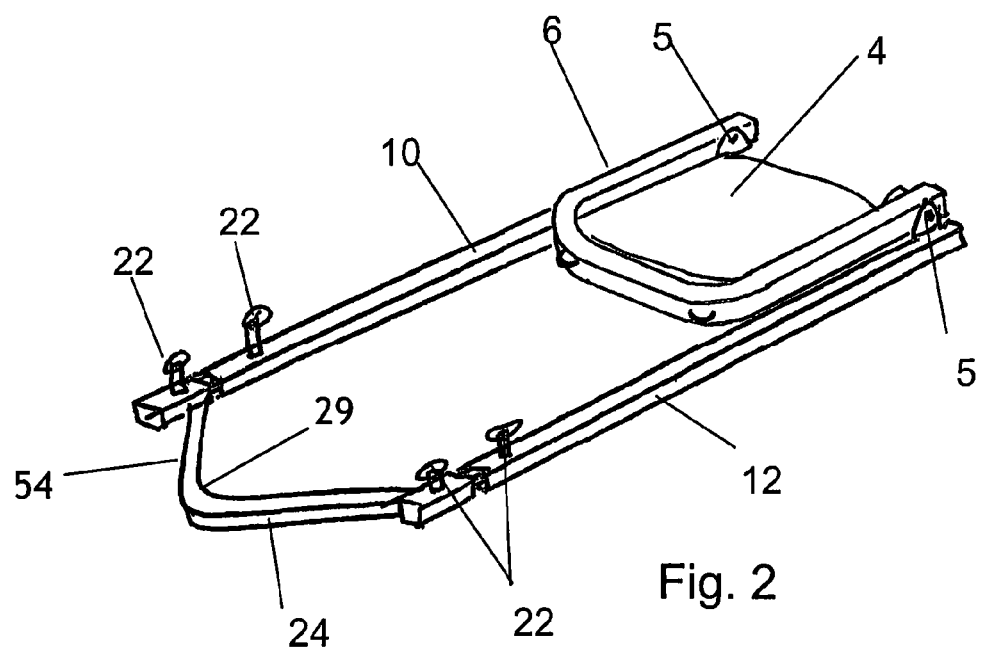
FIG. 2 is a perspective view of the hunting chair in the flat position.
Figure 9:
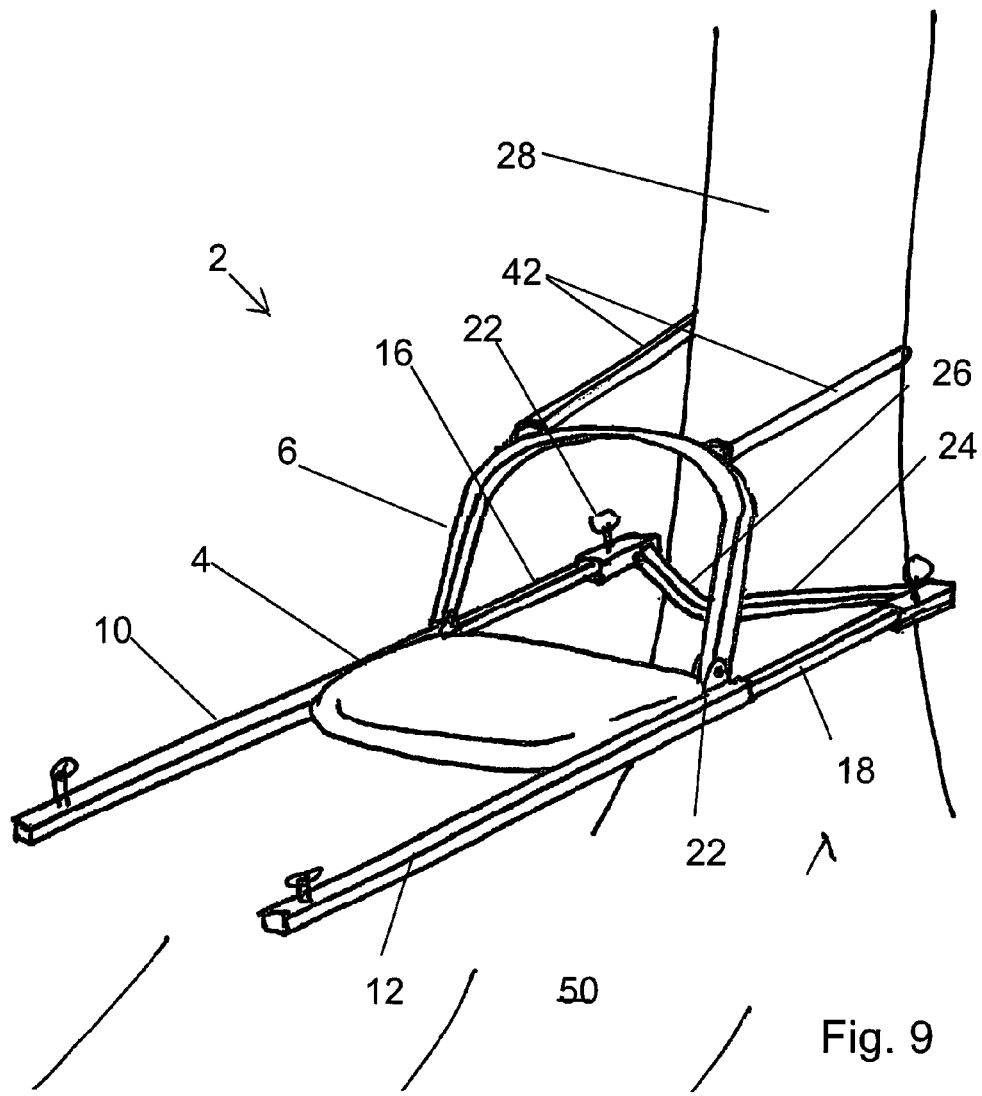
FIG. 9 is a second application of the hunting chair, with the angled member attached to the back of the hunting chair and engaging a tree.
Figure 10:
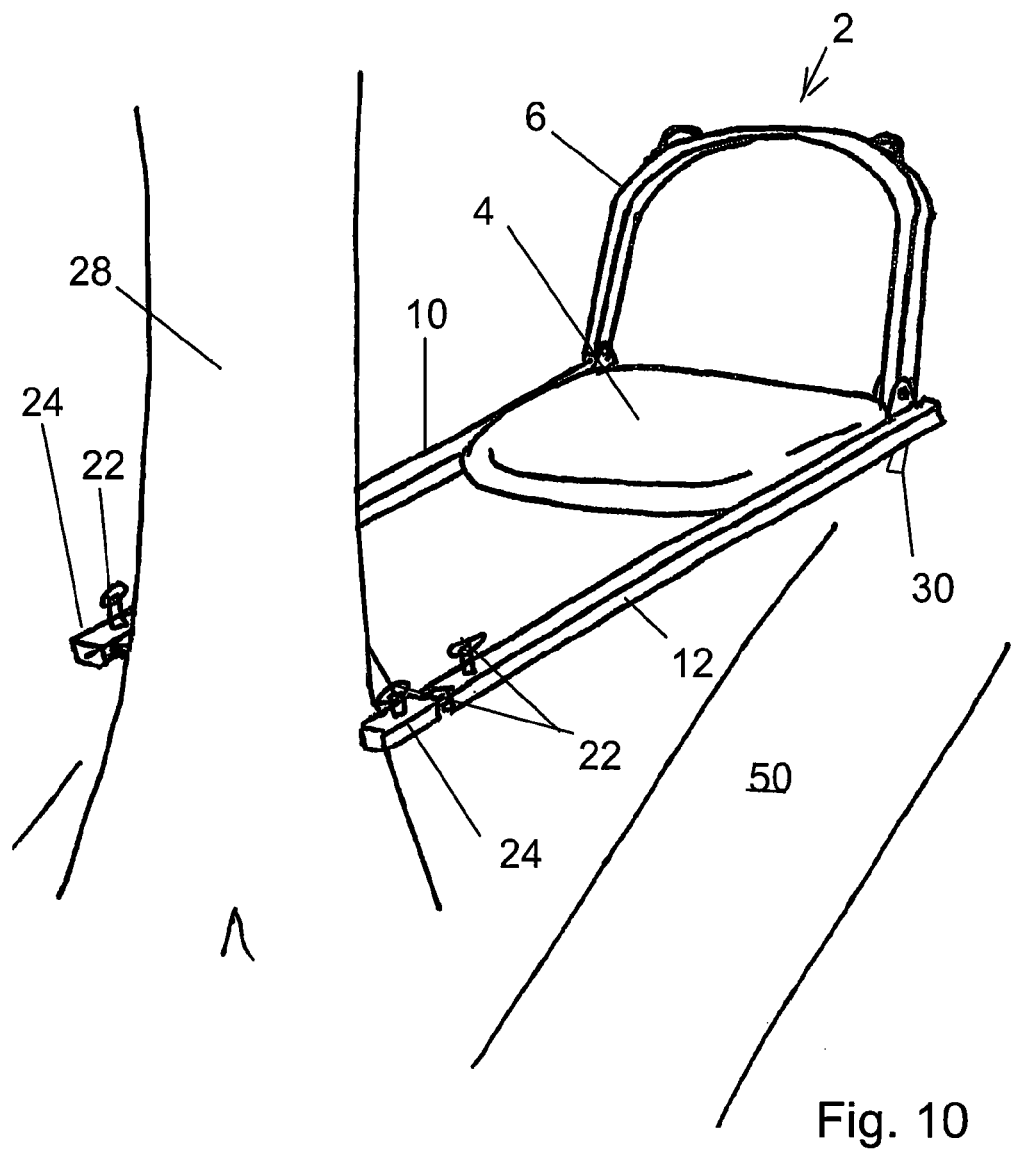
FIG. 10 is a third application of the hunting chair, with the angled member on the front side of the hunting chair and engaging a tree.

A cross brace 54 is illustrated by FIGS. 1, 2, 5, 9,10, 16 and 18. The cross brace 54 may be an angled member 24 that defines a bend 26. The angled member 24 joins to the first and second elongated extension members 16, 18. The angled member 24 may be held in position on the elongated extension members 16, 18 by clevis pins 22. As shown by FIGS. 1 and 5, the angled member 24 may be attached to either the front or the rear of the hunting chair 2. The bend 26 has a concave side 29 and a convex side 31. The cross brace 54 has two orientations for each location. As shown by FIG. 1, the bend 26 may be oriented with the convex side 31 toward the seat 4, or, as shown by FIG. 2, with the concave side 29 toward the seat 4. The cross brace 54 with a bend 26 allows the hunting chair to conform to the available support, such as the trunk of a tree, as shown by FIGS. 9 and 10.

The cross brace 54 may be joined to side supports 10, 12 by pegs

Figure 6:
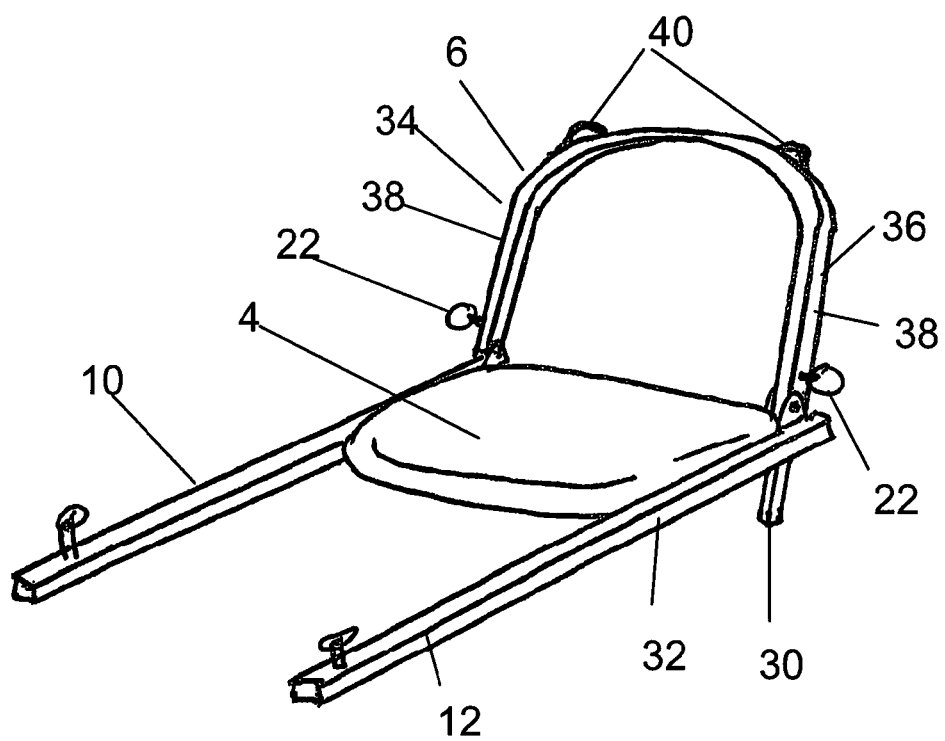
FIG. 6 is a perspective view of the hunting chair with the ground-engaging spikes extended.

As shown by FIG. 6, back rest 6 of hunting chair 2 has a first side 34 and a second side 36. First and second sides 34, 36 may be composed of a hollow back channel 38. Hollow back channel 38 of each of the first and second sides 34, 36 is configured to receive a ground-engaging spike 30, for a total of two ground-engaging spikes 30. The hunter may selectably extend or retract ground engaging spikes 30 from the hollow back channel 38. The hunter may secure the ground engaging spikes 30 in the desired position by clevis pins 22.

Figure 16:
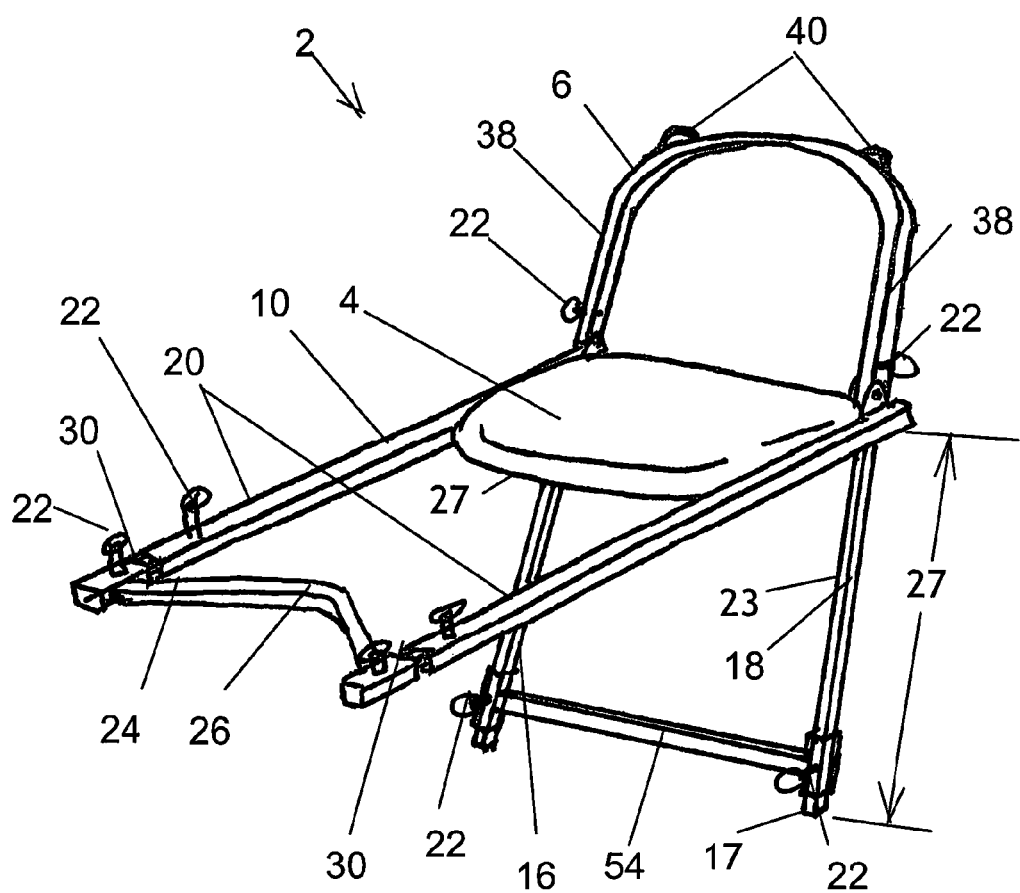
FIG. 16 is a perspective view of another configuration of the hunting chair.

As shown by FIG. 16, the ground engaging spikes 30 may be configured with a cross section similar to that of the elongated extension members 16, 18 and may slideably engage the side channels 20 composing the support arms 10, 12. In such event, the ground engaging spikes 30 are also pegs 33 that can serve to connect the cross brace 54 to the side channels 20.

Figure 7:
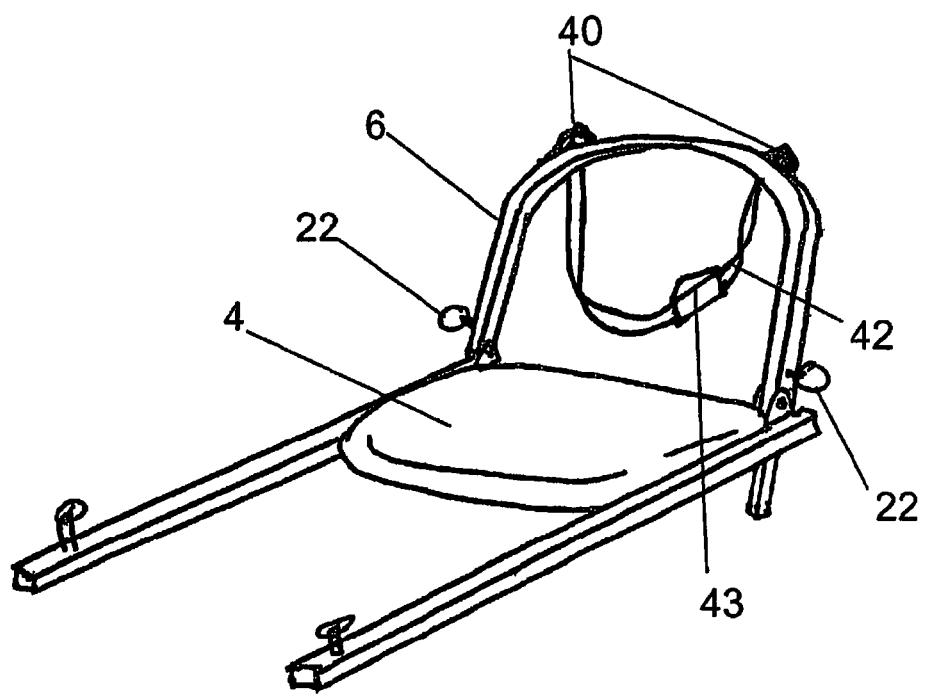
FIG. 7 is a perspective view of the hunting chair illustrating the rope or strap and the attachment points.

FIG. 7 illustrates that back 6 includes two spaced-apart attachment points 40. A strap 40 is connected to both of the attachment points 40. As used in this document, the term 'strap' means any rope, cord, strap, or other object capable of supporting a load only in tension. The strap 42 preferably has little stretch. The length of the strap 42 may be adjusted using a conventional strap tensioning apparatus 43.

Figure 8:
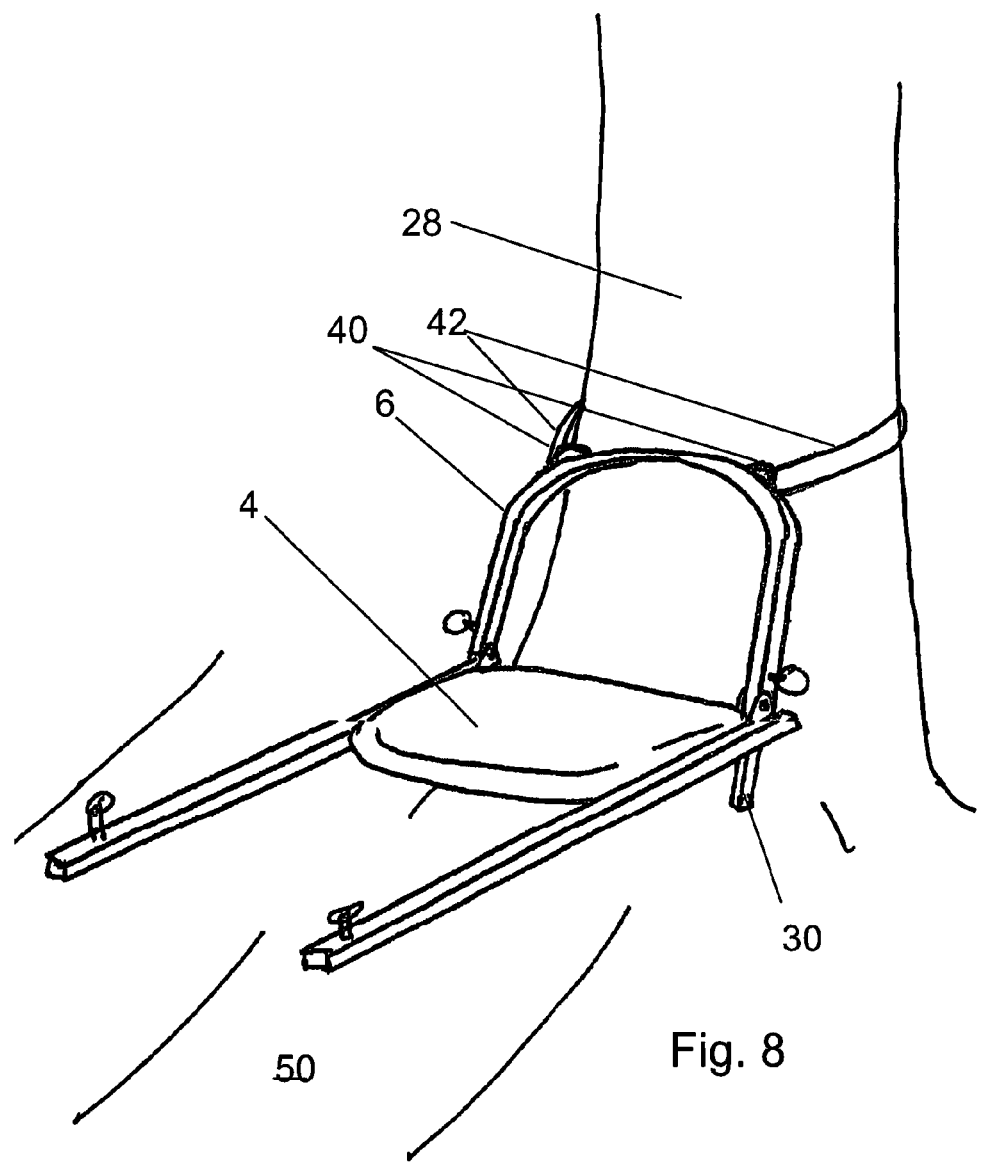
FIG. 8 is a first application of the hunting chair, with the back strapped to and in close proximity to a tree.

The use of the hunting chair 2 is illustrated by FIGS. 8-13. FIG. 8 shows the hunting chair in place on a hillside with ground 50 sloping under the hunting chair 2. The back 6 of the hunting chair 2 is in the upright position and the two attachment points 40 are strapped to a tree 28 by strap 42. Ground-engaging spikes 30 may be deployed to support the back 6; alternatively, back rest 6, and hence the hunting chair 2, may be supported by straps 42 alone. As shown by FIG. 8, the hunting chair 2 is not dependent upon level terrain for a seating position comfortable for the hunter.

FIG. 9 illustrates an application of the hunting chair 2 when it is not desirable to strap the back 6 of the hunting chair 2 directly to the trunk of the tree 28. Angled member 24 is attached to elongated extension members 16, 18 by clevis pins 22. Elongated extension members 16, 18 extend to the rearward of the hunting chair from support arms 10, 12 and are retained in the selected location by clevis pins 22. The bend 26 of angled member 24 causes angled member to center the trunk of tree 28 on the angled member 24, and hence on hunting chair 2. Attachment points 40 are attached to the tree 28 by strap 42. The hunting chair 2 is firmly attached to tree 28, but in a spaced-apart relation to the trunk of the tree 28. The hinge 5 connecting the back rest 6 and the seat 4 features a stop so that the seat 4 and back rest 6 act as a bell crank transferring a downward force on the seat 4 into a tension load on the strap 42. The weight of the hunter applies tension to the strap 42, which tension forces the angled member 24 against tree 28, as by the action of a cam. The cam action causes the hunting chair 2 to remain in the selected position.

FIG. 10 illustrates use of the hunting chair 2 on a hillside behind a tree 2. Ground 50 slopes beneath hunting chair 2. The angled member 24 is attached to the elongated extension members 16, 18 on the front side of hunting chair 2. Bend 26 of angled member 24 engages the trunk of the tree 28 and centers the hunting chair 24 on the trunk of the tree 28. Ground engaging spikes 30 are deployed and assist in holding the hunting chair 2 in place with respect to tree 28. The hunting chair 2 is wedged between the trunk of the tree 28 and ground 50, securely holding hunting chair 2 in position.

Figure 11:
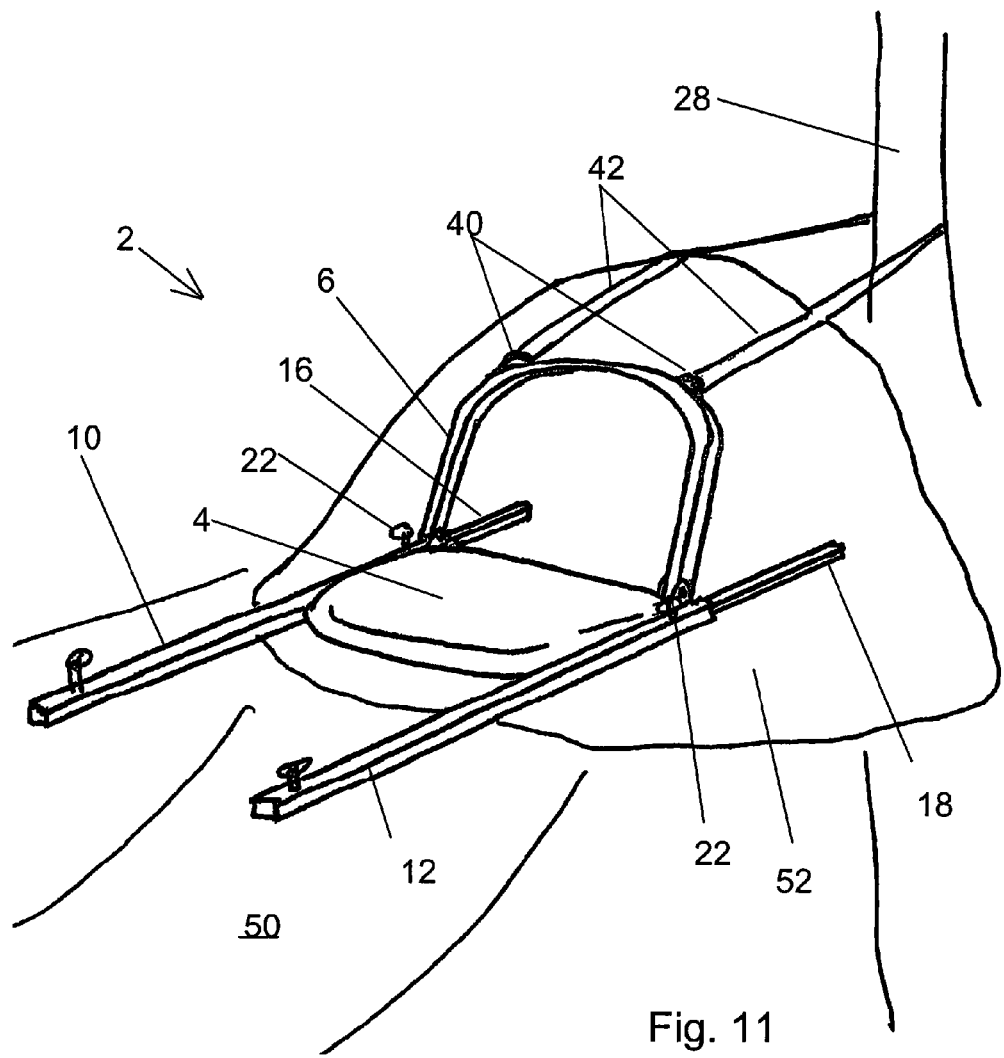
FIG. 11 is a fourth application of the hunting chair, with the elongated extension members extended rearward from the chair and engaging a rock.

FIG. 11 illustrates use of the elongated extension members 16, 18. In the example of FIG. 11, the hunter selects a location in front of a rock 52 or other fixed object with ground 50 sloping away from the hunting chair 2. Elongated extension members 16, 18 are extended differentially to hold the hunting chair 2 in a spaced-apart relation to the rock 52 in the desired orientation and location. Strap 42 extends from attachment points 40 to the trunk of a tree 28, to a second rock 52 or to any other suitable anchor point. The weight of the hunter applies tension to the strap 42, which tension forces the ends of elongated extension members 16, 18 against rock 52, as by the action of a cam. The cam action causes the hunting chair 2 to remain in the selected position.

Figure 12:
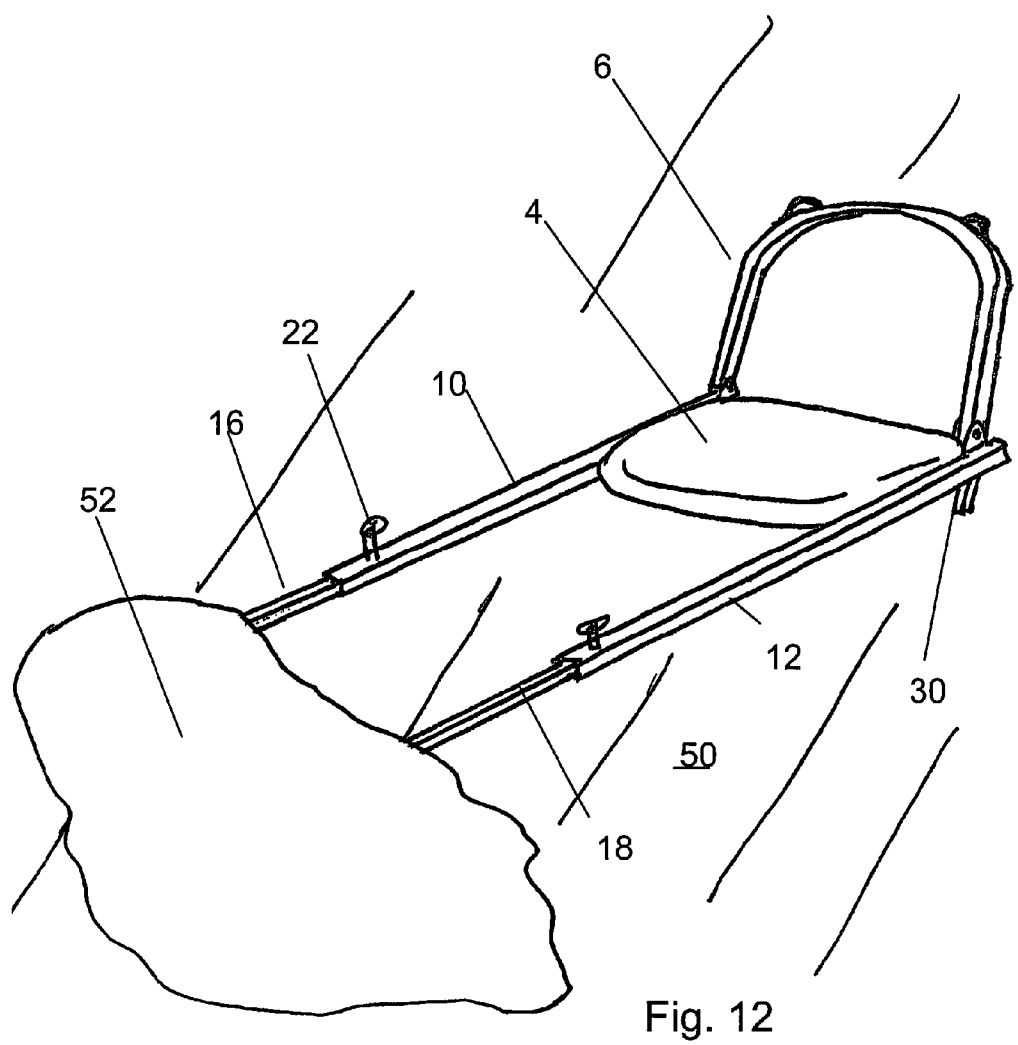
FIG. 12 is a fifth application of the hunting chair with the elongated extension members extending forward and engaging a rock.

FIG. 12 illustrates use of the elongated extension members 16, 18 in the forward direction. The hunter selects a location uphill of a rock 52 or other object too large to be received by angled member 24. The hunter extends the elongated extension members 16, 18 differentially to conform to the selected position and the surface of the rock 52. The hunter attaches the elongated extension members 16, 18 in the desired position with clevis pins 22. The hunter extends the ground-engaging spikes 30. The hunter places the ground-engaging spikes in contact with the ground and the elongated extension members 16, 18 in engagement with the rock 52. The hunting chair 2 is retained in the selected position, even though ground 50 slopes away under the hunting chair 2.

Figure 13:
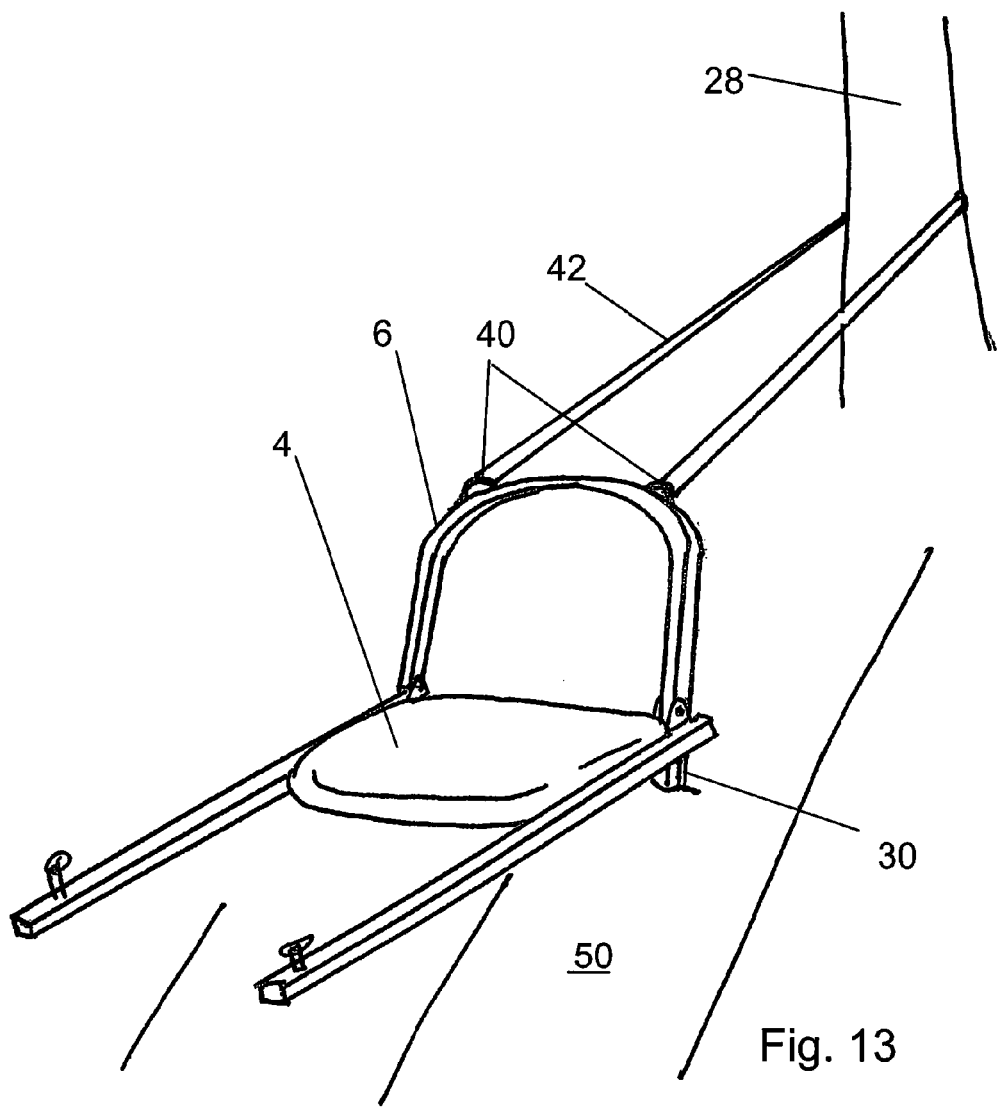
FIG. 13 is a sixth application of the hunting chair with the chair located on a slope at a distance from a tree to which the hunting chair is moored.

FIG. 13 illustrates another use of ground-engaging spikes 30. The hunter selects a location where the ground 50 slopes downhill from a tree 28 or other anchor point. Ground engaging spikes 30 prevent the lower side of the hunting chair 2 from sliding down hill, while straps 42 prevent the back rest 6, and hence hunting chair 2 from pitching forward down the hill.

Figure 14:
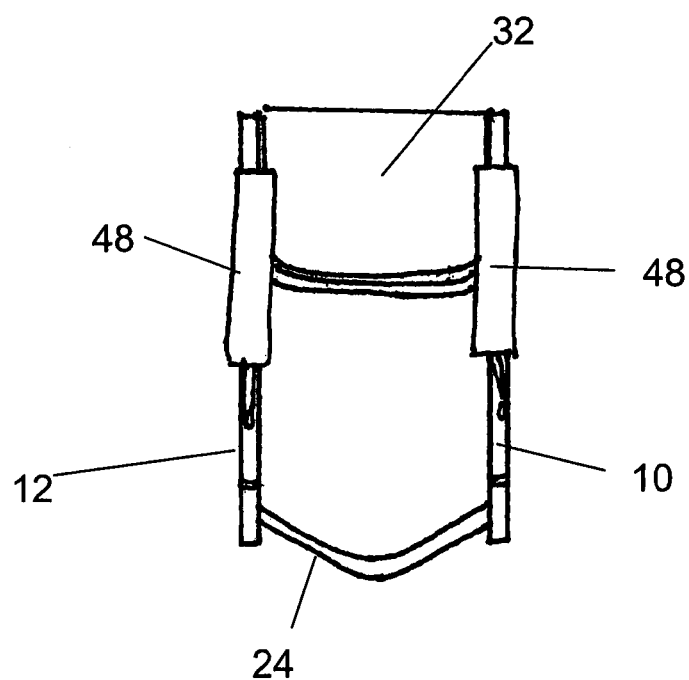
FIG. 14 is a rear view of the folded hunting chair with backpack straps attached.

FIG. 14 illustrates backpack straps 48. The hunting chair 2 may be supported on the back of the hunter by backpack straps 48, easing the transportation of the hunting chair 2 to and from the hunting site. The hunting chair 2 can serve as a pack frame to which loads may be attached. Back rest 6 may be oriented downward when the hunter is wearing the hunting chair 2 and the back rest 6 may be upright, allowing back rest 6 to serve as a shelf to support a load.

Figure 15:
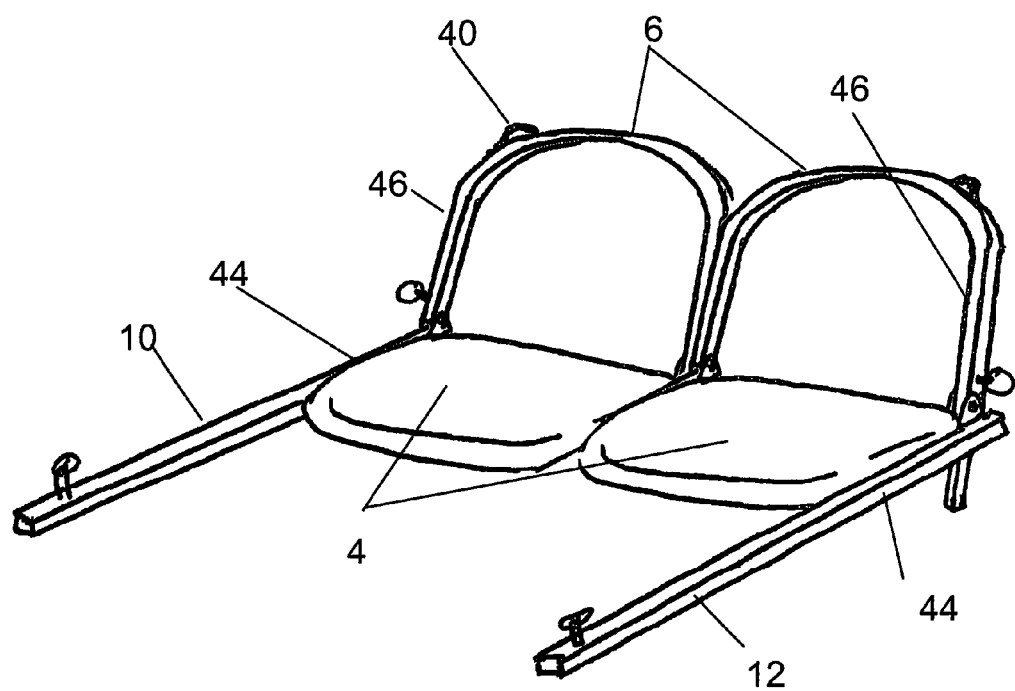
FIG. 15 is a perspective view of a two-person hunting chair.

FIG. 15 illustrates a two person hunting chair 2. The two person hunting chair 2 functions in all respects in the same manner as the one person hunting chair 2, but is provided with one or more seats 4 sized to accommodate two or more persons. The two person embodiment includes support arms 10, 12, elongated extension members 16, 18, an angled member 24 and ground-engaging spikes 30.

FIG. 16 illustrates an additional configuration of the hunting chair 2 for use in the situation where the hunter wishes to sit higher above the ground 50 than shown by FIGS. 8-13. As shown by FIG. 16, elongated extension members 16, 18 may be inserted into hollow back channels 38 on either side of back 6. The first and second elongated extension members 16, 18 are retained in position with clevis pins 22. A cross brace 54 slides over elongated extension members 16, 18 and is held in place by clevis pins 22. Cross brace 54 reinforces elongated extension members 16, 18. Elongated extension members 16, 18 define downwardly extending legs 23 when inserted into hollow back channels 38. Elongated extension members 16, 18 define a length 27 of the downwardly extending legs 23 between the downwardly extending leg end 25 and the bottom 27 of the seat 4. The length 27 is selectable by the hunter.

Ground-engaging spikes 30 optionally are inserted within first and second support arms 10, 12 and held in place with clevis pins 22. The angled member 24 optionally may be attached to ground engaging spikes 30 either on the front end of first and second support arms 10, 12 as shown by FIG. 16, or on the opposite end of first and second support arms 10, 12. When the angled member 24 is attached to either end of first and second support arms 10, 12, the hunting chair 2 may be supported by a tree 28 or other object as illustrated by FIGS. 9 and 10. The hunting chair 2 may be supported in the configuration illustrated by FIG. 16 in any of the positions illustrated by FIGS. 8-13.

Figure 17:
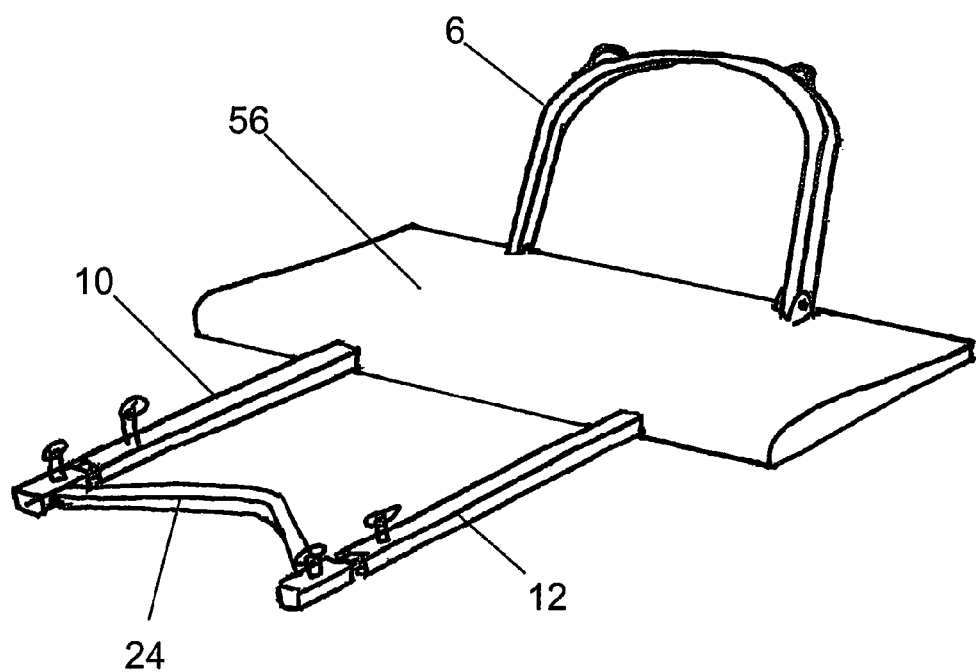
FIG. 17 is a perspective view of a second two-person hunting chair.

FIG. 17 illustrates a selectably attachable two-person seat 56. The selectably attachable two-person seat 56 may be attached to the hunting chair 2 to allow two persons to hunt together. The hunting chair 2 with the two-person seat 56 attached may be used in any of the configurations illustrated by FIGS. 8-13 and 16. The two-person seat 56 may be detached for use of the hunting chair 2 by one person or for transportation of the hunting chair.

In all embodiments and in each of the examples described above, the hunting chair can support a hunter on sloping ground 50 so that the hunter is not required to depend on level terrain to support the hunting chair 2.

Figure 18:
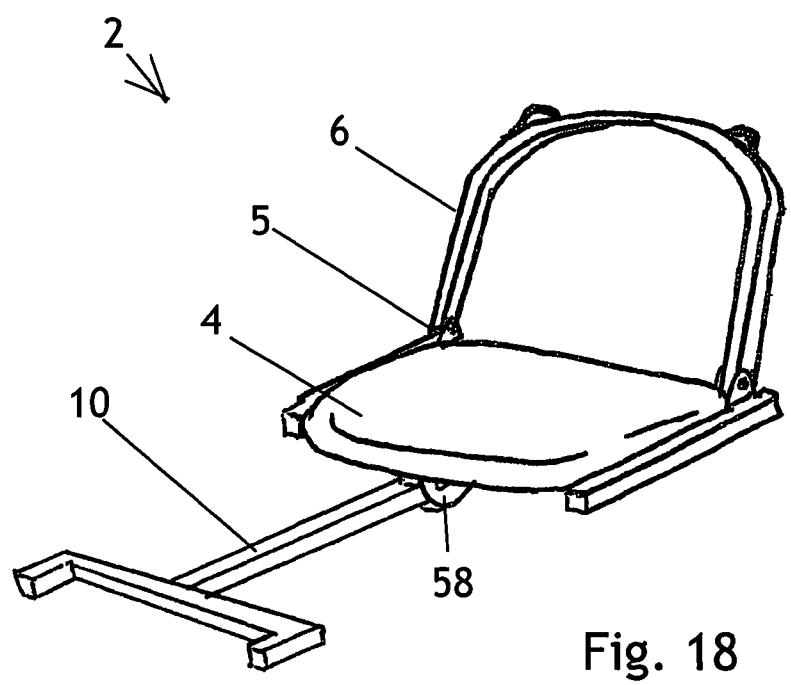
FIG. 18 is a perspective view of an alternative embodiment.
Figure 19:
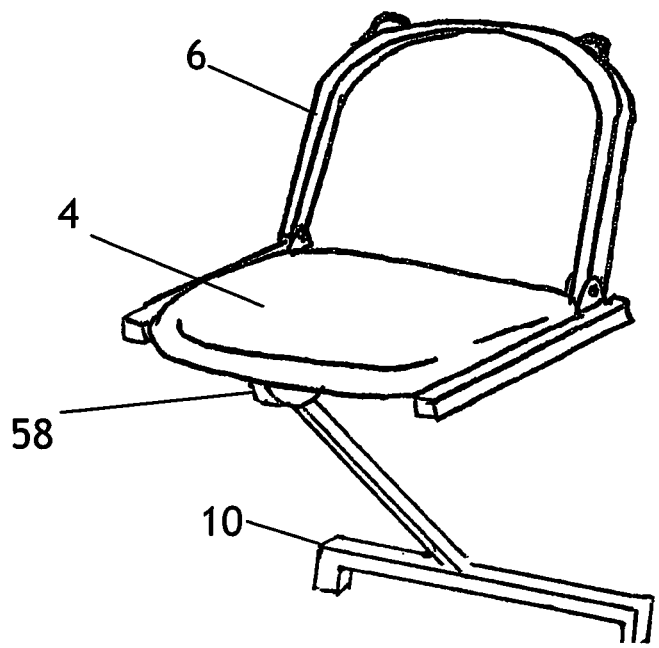
FIG. 19 is a second perspective view of the alternative embodiment.
Figure 20:
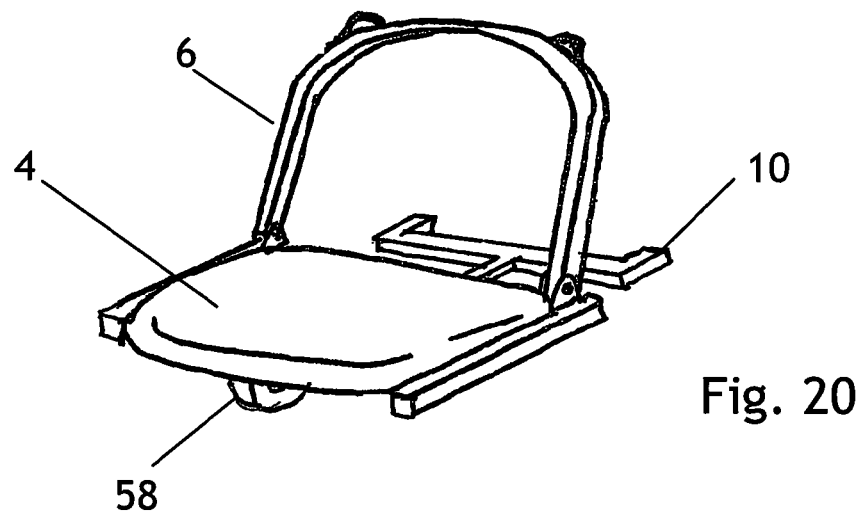
FIG. 20 is a third perspective view of the alternative embodiment.

FIGS. 18 through 20 show an alternative embodiment of the hunting chair 2. In the alternative embodiment, support arm 10 is connected by a support arm hinge 58 to seat 4. Support arm 10 may rotate about support arm hinge 58 among user-selectable positions. FIG. 18 illustrates a first support arm 10 position where the support arm 10 is proximal to the front edge 14 of the seat 4. When the support arm 10 is fixed in the first position, the hunting chair 2 functions as described above relating to FIG. 10.

FIG. 20 illustrates the support arm 10 in a second position in which the support arm 10 is proximal to the rear edge 15 of the seat 4. In the second position, the alternative embodiment functions as described above relating to FIG. 9.

FIG. 19 illustrates the support arm 10 in a third position in which the support arm 10 depends downward from seat 4 and in which support arm functions as the downwardly extending leg 23 described above relating to FIG. 16.

Figure 21:
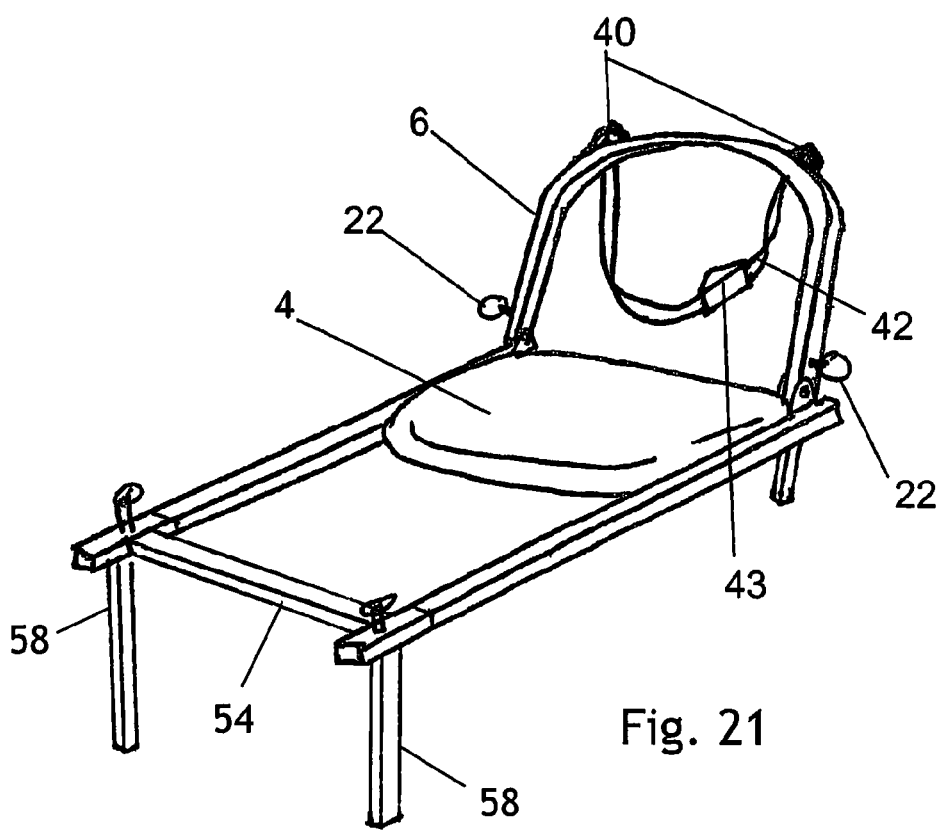
FIG. 21 is a perspective view of the folding hunting chair with downhill legs.

From FIG. 21, the folding hunting chair may be equipped with downhill legs 58 to support the chair on a hill when no tree or rock is available. Downhill legs 58 may be attached to cross brace 54 that is attached to the support arms 10, 12. The downhill legs 58 support the front ends 17 of the support arms 10, 12 above the ground. The connection of the downhill legs 58 to the cross brace 54 may be hinged to allow adjustment of the downhill legs 58 with respect to the cross brace 54. Alternatively, the downhill legs 58 may be extendable with respect to the cross brace 54 for the same purpose, as by a channel communicating through the cross brace 54 and configured to receive the downhill legs 58. The downhill legs 58 may be defined by the first and second elongated extension members 16, 18, or by ground-engaging spikes 30.

I claim:

1. A hunting chair apparatus, the apparatus comprising:
   a. a seat;
   b. a back rest, said back rest engaging said seat, said back rest having an upright position with respect to said seat and a flat position with respect to said seat, said seat and said back rest together defining a facing direction of a human being when said human being is sitting on said seat with a back of said human being against said backrest, said seat defining a rearward direction opposite to said facing direction;
   c. a first support arm and a second support arm, said first and said second support arms being disposed on opposing sides of said seat, said first and said second support arms being generally parallel, said first and said second support arms both being oriented in said facing direction and said rearward direction;
   d. said first support arm defining a first arm forward length in said facing direction, said second support arm defining a second arm forward length in said facing direction, each of said first support arm forward length and said second support arm forward length being selectable and selectably fixed independent of the other of said first support arm forward length and said second support arm forward length;
   e. said first support arm defining a first arm rearward length in said rearward direction, said second arm defining a second arm rearward length in said rearward direction, each of said first support arm rearward length and said second support arm rearward length being selectable and selectably fixed independent of the other of said first support arm rearward length and said second support arm rearward length; and
   f. a downwardly extending leg, said downwardly extending leg selectably depending from said backrest, said downwardly extending leg being configured to support said human being when said back rest is in said upright position and said downwardly extending leg is depending from said backrest, said downwardly extending leg having a downwardly extending leg end, said downwardly extending leg defining a leg length between said bottom of said seat and said downwardly extending leg end when said back rest is in said upright position, said leg length being selectably fixed by said user.

2. The apparatus of claim 1 wherein said seat defining a front edge in said facing direction and a rear edge opposite to said front edge, said first support arm and said second support arm each defining a front end in said facing direction, said first arm forward length being defined by a distance between said front edge of said seat and said front end of said first arm, said second arm forward length being defined by said distance between said seat forward edge and said front end of said second arm, said first support arm and said second support arm each defining a back end in said rearward direction, said first arm rearward length being defined by said distance between said first arm back end and said rear edge of said seat, said second arm rearward length being defined by said distance between said second arm back end and said rear edge of said seat.

3. The apparatus of claim 1, each of said first and said second said support arms comprising: an elongated extension member and a side channel, said side channels being attached to opposing sides of said seat, each said elongated extension member being in a selectably fixed engagement with a one of said side channels, said selectably fixed engagement between said side channels and said elongated extension members defining said forward length of said support arms and said rearward length of said support arms.

4. A hunting chair apparatus, the apparatus comprising:
   a. a seat having a front edge and a bottom side, said seat being disposed generally on a plane;
   b. a back rest, said back rest engaging said seat, said back rest having an upright position with respect to said seat and a flat position with respect to said seat, said seat and back rest being configured to receive and to support a human being sitting on said seat with a back of said human being engaging said back rest when said back rest is in said upright position, said seat and said back rest together defining a facing direction of said human being when said human being is sitting on said seat;
   c. a support arm, said support arm falling generally on said plane, said support arm being attached to and configured to support said seat, said support arm having an end, said end being in a spaced apart relation to said front edge of said seat, said support arm defining a forward length between said end and said front edge of said seat in said facing direction and generally on said plane wherein said forward length is selectable by a user and wherein said seat has a rear edge opposite to said front edge, said support arm having a back end opposite to said front end, said support arm defining a rearward length between said back end of said support arm and said rear edge of said seat in a rearward direction opposite to said facing direction and generally on said plane, said rearward length being selectable by said user, said support arm comprising: an elongated extension member and a side channel, said side channel being attached to said seat, said elongated extension member being configured for a selectable engagement with said side channel, said selectable engagement between said side channel and said elongated extension member defining said forward length of said support arm and said rearward length of said support arm when said elongated extension member and said side channel are in said selectable engagement;
   d. a downwardly extending leg, said downwardly extending leg selectably depending from said backrest, said downwardly extending leg being configured to support said human being when said back rest is in said upright position and said downwardly extending leg is depending from said backrest, said downwardly extending leg having a downwardly extending leg end, said downwardly extending leg defining a leg length between said bottom of said seat and said downwardly extending leg end when said back rest is in said upright position, said leg length being selectable by said user wherein said back rest is configured for a selectable engagement with said elongated extension member when said back rest is in said upright position, said elongated extension member and said back rest defining said downwardly extending leg and defining said leg length when said back rest and said elongated extension member are in said selectable engagement.

5. The apparatus of claim 4, the apparatus further comprising: a hinge, said hinge connecting said seat and said backrest, said backrest being foldable about said hinge between said upright position and said flat position.

6. The apparatus of claim 1, the apparatus further comprising: a support arm hinge attached to said seat, said first support arm and said second support arm being attached to said hinge, wherein said seat and said first and said second support arms are in a rotatable engagement about said support arm hinge, said support arms selectably defining said downwardly extending leg, said rotatable engagement selectably defining said forward length, said rearward length and said leg length, said rotatable engagement selectably defining said orientation of said support arms in said facing direction and said rearward direction.

7. A hunting chair apparatus, the apparatus comprising:
a. a seat;
b. a back rest, said back rest engaging said seat, said back rest having an upright position with respect to said seat and a flat position with respect to said seat, said seat and said back rest together defining a facing direction of a human being when said human being is sitting on said seat with a back of said human being against said backrest, said seat defining a rearward direction opposite to said facing direction;
c. a first support arm and a second support arm, said first and said second support arms being disposed on opposing sides of said seat, said first and said second support arms being generally parallel, said first and said second support arms both being oriented in said facing direction and said rearward direction;
d. said first support arm defining a first arm forward length in said facing direction, said second support arm defining a second arm forward length in said facing direction, each of said first support arm forward length and said second support arm forward length being selectable and selectably fixed independent of the other of said first support arm forward length and said second support arm forward length;
e. said first support arm defining a first arm rearward length in said rearward direction, said second arm defining a second arm rearward length in said rearward direction, each of said first support arm rearward length and said second support arm rearward length being selectable and selectably fixed independent of the other of said first support arm rearward length and said second support arm rearward length; and
f. a cross brace, said cross brace being configured to selectably attach to said first support arm and said second support arm, said cross brace being oriented generally normal to said first and said second support arms when said first cross brace is attached to said first and said second support arms.

8. The apparatus of claim 7 wherein said cross brace defining a bend, said bend defining a concave side and a convex side, said cross brace having a selectable first and a selectable second position with respect to said seat when said cross brace is in engagement with said first and said second support arms, said concave side being distal to said seat when said cross brace is in said first position, said convex side being distal to said seat when said cross brace is in said second position, said concave side being configured to engage a trunk of a tree.

9. The apparatus of claim 7 wherein said first and said second side arm supports are elongated and extend from said seat in said facing direction, said forward length of said first and said second support arms being selected to accommodate a leg of a human being between said front edge of said seat and said cross brace when said cross brace is attached to said first and said second side arm supports and said human being is sitting on said seat.

10. The apparatus of claim 9, the apparatus further comprising: a pair of pegs, said seat back defining a pair of back channels, each of said pair of pegs being configured to selectably and slidably engage a one of said back channels, each of said pair of pegs depending downwardly from said seat when said pair of pegs are in said slidable engagement with said back channels, each of said pair of pegs defining a ground-engaging spike when said pair of pegs are in said slidable engagement with said back channels.

11. A hunting chair apparatus, the apparatus comprising:
a. a seat having a front edge, said seat being disposed generally on a plane;
b. a back rest, said back rest engaging said seat, said back rest having an upright position with respect to said seat and a flat position with respect to said seat, said seat and back rest being configured to receive and to support a human being sitting on said seat with a back of said human being engaging said back rest when said back rest is in said upright position, said seat and said back rest together defining a facing direction of said human being when said human being is sitting on said seat;
c. a first support arm, said first support arm falling generally on said plane, said first support arm being attached to and configured to support said seat, said first support arm having a first support arm front end, said first support arm front end being in a spaced apart relation to said front edge of said seat;
d. a second support arm having a second support arm front end, said first and said second support arms being disposed on opposite sides of said seat and generally in said plane, said first and said second support arms being generally parallel;
e. a cross brace, said cross brace being configured to selectably attach to said first support arm front end and said second support arm front end, said cross brace being oriented generally normal to said first and said second support arms when said cross brace is attached to said first and said second support arms, said first and said second support arms are elongated and extend from said seat in said facing direction, each of said first and said second support arms defining a forward length, said forward length being selected to accommodate a leg of a human being between said front edge of said seat and said cross brace when said cross brace is attached to said first and said second side arm supports and said human being is sitting on said seat;
f. a pair of pegs, said seat back defining a pair of back channels, each of said pair of pegs being configured to selectably and slidably engage a one of said back channels, each of said pair of pegs depending downwardly from said seat when said pair of pegs are in said slidable engagement with said back channels, each of said pair of pegs defining a ground-engaging spike when said pair of pegs are in said slidable engagement with said back channels, wherein each of said pair of pegs is configured for said slidable engagement with a one of said side arm supports and said cross brace is configured for slidable engagement with said pair of pegs, whereby each said peg selectably connects to a one said side arm support and said cross brace selectably connects to said pair of pegs.

12. The apparatus of claim 11 wherein said pair of pegs is configured for said slidable engagement with said side arm supports in a first side arm support position proximal to said front edge of said seat and in a second side arm support position proximal to said rear edge of said seat.

13. The apparatus of claim 12 wherein said back rest is in a hinged connection with said seat, said hinged connection featuring a stop restricting rotation of said seat with respect to said back rest, said stop being configured to prevent relative rotation of said seat and said back rest beyond said upright position of said back rest with respect to said seat, a top of said back rest being configured for connection by a strap to a fixed object, said strap having a user-selectable length.

14. The apparatus of claim 9, the apparatus further comprising: a pair of downhill legs, each of said downhill legs being configured to selectably depend in a downward direction from said front end of a one of said first and said second support arms, each of said first and said second downhill legs being configured to engage a ground and to selectably support said front ends of said first and said second support arms above said ground.

15. A hunting chair apparatus, the apparatus comprising:
a. a seat, said seat having a front edge and a back edge distal to said front edge, said seat, said front edge and said back edge being disposed generally on a plane;
b. a back rest, said back rest being foldably connected to said seat, said back rest having an upright position and a flat position with respect to said seat, said seat and said backrest being configured to support a human being sitting on said seat with a back of the human being engaging said back rest, said seat and said back rest defining a facing direction, said back rest defining a first and a second back rest channel, said first and said second back rest channels being arrayed on opposing sides of said back rest;
c. a first and a second seat support, said first and said second seat supports being arrayed on opposite sides of said seat and generally in said plane, said first and said seat supports being elongated in said facing direction and extending beyond said front edge of said seat, said first and said second seat supports defining a front end, said front end and said front edge of said seat defining a forward length of said seat supports in said facing direction, said forward length being selected to accommodate a leg of said human being when said human being is seated on said seat, said first and said second seat supports comprising:
i. a first and a second side channel arrayed on opposite sides of said seat;
ii. a first and a second elongated extension member, said first and said second elongated extension members being configured to adjustably engage said first and said second side channels generally in said plane, said first and said side channel in combination with said first and said second elongated extension members defining said first and said second seat supports, said elongated extension members being configured to extend in a rearward direction opposite to said facing direction, said first and said extension members defining a rearward length between said back edge of said seat and a rear end of said elongated extension members in said rearward direction, said rearward length being user selectable, wherein said first and said second back rest channels are configured to receive and to retain said elongated extension members when said back rest is in said upright position, said elongated extension members being configured to depend downwardly from said seat and to support said human being above a ground when said elongated extension members are received by said back rest channels, the apparatus further comprising: a cross brace, said cross brace being configured to connect said first elongated extension member to said second elongated extension member, said cross brace defining a bend defining a convex curve and concave curve, said cross brace having a first cross brace position and a second cross brace position with respect to said elongated extension member, said convex curve being proximal to said front edge in said first cross brace position, said concave curve being proximal to said front edge when said cross brace is in said second cross brace position.

* * * * *